United States Patent [19]
Mawhinney et al.

[11] Patent Number: 6,038,219
[45] Date of Patent: *Mar. 14, 2000

[54] USER-CONFIGURABLE FRAME RELAY NETWORK

[75] Inventors: Ted N. Mawhinney, Clearwater; Richard A. Mundwiler, Safety Harbor, both of Fla.

[73] Assignee: Paradyne Corporation, Largo, Fla.

[*] Notice: This patent is subject to a terminal disclaimer.

[21] Appl. No.: 08/888,872

[22] Filed: Jul. 7, 1997

Related U.S. Application Data

[60] Provisional application No. 60/034,456, Dec. 31, 1996.

[51] Int. Cl.[7] .................................................. H04L 12/56
[52] U.S. Cl. ............................................ 370/242; 370/251
[58] Field of Search ................................. 370/217, 218, 370/219, 221, 225, 227, 228, 237, 242, 244, 248, 249, 251, 252, 241, 401, 226, 385, 397, 247

[56] References Cited

U.S. PATENT DOCUMENTS

| | | | |
|---|---|---|---|
| 4,993,015 | 2/1991 | Fite, Jr. .................................... | 370/218 |
| 5,226,037 | 7/1993 | Satomi et al. ........................... | 370/220 |
| 5,398,236 | 3/1995 | Hemmady et al. . | |
| 5,412,376 | 5/1995 | Chujo et al. . | |
| 5,502,712 | 3/1996 | Akita ....................................... | 370/225 |
| 5,521,909 | 5/1996 | Holloway et al. ...................... | 370/404 |
| 5,521,914 | 5/1996 | Mavraganis et al. . | |
| 5,546,378 | 8/1996 | Wirth et al. ............................. | 370/223 |
| 5,729,528 | 3/1998 | Salingre et al. ........................ | 370/230 |
| 5,781,528 | 7/1998 | Sato et al. ............................... | 370/218 |
| 5,809,011 | 9/1998 | Almay .................................... | 370/218 |

OTHER PUBLICATIONS

Local & Metropolitan Area Networks, William Stallings pp. 43–45.

*Primary Examiner*—Douglas W. Olms
*Assistant Examiner*—Kenneth Vanderpuye
*Attorney, Agent, or Firm*—Thomas, Kayden, Horstemeyer & Risley, L.L.P.

[57] ABSTRACT

A user-configurable frame relay network system is provided. In accordance with one aspect of the invention, the system is designed around a service provided frame relay network. More specifically, a plurality of frame relay user equipment are configured to intercommunication via one or more primary communication links that pass through a service provided frame relay network. At least one frame relay access unit is interposed between the service provided frame relay network and each frame relay user equipment. In this way, communications between the various frame relay user equipment pass through the frame relay access units. At least one secondary communication link extends from a first access unit of the plurality of access units to a second access unit of the plurality of access units, the at least one communication link being outside the service provided frame relay network.

3 Claims, 13 Drawing Sheets

| | Transmitter Device | | | | Receiver Device | |
|---|---|---|---|---|---|---|
| Frame Type | Address | Message Type | Seq. # | | Monitor Pattern | DTE |
| Multiplexed | 63 | Pattern Message | 1 | ⟶ | Valid | |
| Transparent | None | n/a | n/a | ⟶ | User | ⟶ |
| Multiplexed | 1 | n/a | n/a | ⟶ | User | ⟶ |
| Multiplexed | 63 | Pattern Message | 2 | ⟶ | Valid | |
| Multiplexed | 1 | n/a | n/a | ⟶ | User | ⟶ |
| Transparent | None | n/a | n/a | ⟶ | User | ⟶ |
| Multiplexed | 63 | Pattern Message | 3 | ⟶ | Valid | |
| Multiplexed | 63 | Pattern Message | 4 | Dropped | | |
| Multiplexed | 63 | Pattern Message | 5 | ⟶ | Error | |

FIG. 9A

| Transmitter Device | | | | Receiver Device | |
|---|---|---|---|---|---|
| Frame Type | Address | Message Type | Seq. # | Monitor Pattern | DTE |
| Multiplexed Valid | 63 | Pattern Message | 1 | ⎯⎯⎤ | |
| Transparent | None | n/a | n/a | ⎯→ User | ⎯→ |
| Multiplexed | 1 | n/a | n/a | ⎯→ User | ⎯→ |
| Multiplexed Valid | 63 | Pattern Message | 2 | ⎯⎯⎤ | |
| Multiplexed | 1 | n/a | n/a | ⎯→ User | ⎯→ |
| Transparent | None | n/a | n/a | ⎯→ User | ⎯→ |
| Multiplexed Valid | 63 | Pattern Message | 3 | ⎯⎯⎤ | |
| Multiplexed | 63 | Pattern Message | 4 | Dropped | |
| Multiplexed Error | 63 | Pattern Message | 5 | ⎯⎯⎤ | |

FIG. 9B

| Transmitting Device | | | | | Receiving Device | | | |
|---|---|---|---|---|---|---|---|---|
| Frame Type | Addr. | Message Type | Seq. # | | Seq. # | Message Type | Addr. | Frame Type |
| Multiplexed | 63 | Connect Request | 1 | ⎯→ | | | | |
| Successful | | | | ⎯⎯⎯→ | 1 | Connect Request | 63 | Multiplexed |

FIG. 9C

USER-CONFIGURABLE FRAME RELAY NETWORK

CROSS-REFERENCE TO RELATED APPLICATIONS

This application claims the benefit of U.S. Provisional patent application Ser. No. 60/034,456, filed on Dec. 31, 1996, and entitled Frame Relay Edge Network.

BACKGROUND OF INVENTION

1. Field of the Invention

The present invention generally relates to frame relay networks, and more particularly to a user-configurable frame relay network that may be reconfigured under the control of a user or user equipment, while at the same time providing all the benefits of a service provided frame relay network.

2. Discussion of the Related Art

As is known, frame relay is a stream-lined method for packet switching that operates at the data link layer of the OSI model, and has significantly less overhead than traditional packet switching techniques. By way of background, the provision of digital communications paved the way for technology referred to as packet switching, which is carried out by dividing communicated data (where data broadly denotes voice, data, video, etc.) into discrete units known as packets. Packets may be time multiplexed to allow multiple users or end points to communicate across a common line.

As is further known, X.25 is a popular protocol used for controlling and managing packet switched communications. It utilizes call-control packets to set-up and clear virtual circuits, and carries these call-control packets on the same channel and same virtual circuit as data packets are carried. In this regard, X.25 utilizes in-band signaling. However, X.25 demands considerable overhead, and therefore sacrifices data throughput In this regard, X.25 protocol requires an acknowledgment packet to acknowledge the reception of each packet at every intermediate node along a transmission path or virtual circuit. State tables must be maintained, at each intermediate node, for each virtual circuit to deal with the call management and flow control/error control aspects of the X.25 protocol.

The further development, however, of packet switching technologies into frame relay transmissions represented a significant advance in the state of the art. Frame relay technology makes the assumption that the integrity of a communication link will remain intact. Using this assumption, frame relay does not require individual acknowledgments from each intermediate node along a communication path, that a particular data packet has been successfully received. It also eliminates the overhead associated with the maintenance of state tables for transmissions. As a result, frame relay technology realizes significantly improved throughput over that realized by X.25 protocol. The down side of frame relay is that data packets do occasionally get lost, discarded, or otherwise unsuccessfully transmitted. Any type of error control imposed on frame relay, must be implemented from a higher layer (e.g., the transport layer) of the OSI model.

In the early days of frame relay technology, service provided networks did not exist. Therefore, users of frame relay technology typically had frame relay user equipment interconnected by way of a leased line, for example. By way of illustration, a corporate enterprise having geographically dispersed offices wishing to intercommunicate via frame relay may have purchased a leased line from a communication service provider, which leased line was dedicated to run between the frame relay equipment at each end. This, however, was a relatively costly solution, as it required the purchase of a dedicated line, which may not be fully utilized if there were only intermittent communications between the two end points.

The proliferation of frame relay technology, however, led to the creation and provision of frame relay service networks by service providers. As is known, a frame relay service provider network effectively comprises a mesh of interconnected nodes that can be variably configured to provide a communication path between a plurality of end points. Returning to the previous example, a geographically dispersed corporate enterprise may intercommunicate using frame relay technology by purchasing from the service provider what are known as permanent virtual circuits. A permanent virtual circuit is a configuration of various intermediate nodes in the frame relay service network which are dedicated to direct communications between a first end point and a second end point along a particular path. The service provider will typically establish permanent virtual circuits, within a frame relay network, in a way that evenly distributes data traffic and minimizes traffic congestion. Therefore, as additional users/communicating end points are added to the frame relay service network, the service provider may alter or otherwise reconfigure various permanent virtual circuits. However, it will communicate any such changes to the users at the end points.

Data link connection identifiers (DLCI's) are numbers that identify the various intermediate nodes between end points of a frame relay communication link. DLCI's identify the various intermediate nodes and therefore identify the particular communication path between end points. As is known, the provision of permanent virtual circuits simplifies the error control mechanisms for data transport utilizing frame relay technology, as opposed to communication links which are based on IP addresses and routers (where the communication path may vary from packet to packet). However, a disadvantage of the service provided frame relay service network is that, although it is reconfigurable, it is not dynamically reconfigurable. Stated another way, it is not user configurable. Rather, once a permanent virtual circuit is established by the service provider, it remains fixed unless and until the service provider reestablishes a different communication path. Therefore, if a user identifies a fault in the communication link, the user must generally report that fault to the service provider and wait for the service provider to setup an alternative route of communication. This is extremely costly in instances where the need to transport data is time sensitive.

Accordingly, there is a need to address this and other related shortcomings in the art, by providing an enhanced medium for communicating in accordance with frame relay technology, that is dynamically user configurable.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for providing a user-configurable frame relay network In accordance with one aspect of the invention, the system is designed around a service provided frame relay network. More specifically, a plurality of frame relay user equipment are configured to intercommunication via one or more primary communication links that pass through a service provided frame relay network. At least one frame relay access unit is interposed between the service provided frame relay network and each frame relay user equipment. In this way, communications between the various frame relay user equipment pass through the frame relay access units. At least one secondary communication link extends from a first access unit of the plurality of access units to a second access unit of the plurality of access units, and is outside the service provided frame relay network.

In accordance with the preferred embodiment of the present invention, communications may be directed across the secondary communications link, which therefore pass outside of the service provided frame relay network. One advantage of this feature relates to the fault tolerance of the system provided by the present invention. As is known, the primary communication link defined within the service provided frame relay network is often configured as a permanent virtual circuit. While user equipment may be configured to perform testing on such a primary communication link, the user is generally helpless to do any thing about the detection of a failed condition, other than report it to the provider of the service provided frame relay network. If a new primary communication link must be established, the user must wait for a period of time, until the service provider effects such a change.

As will be described in more detail below, the user-configurable network improves upon this shortcoming in the prior art by providing one or more secondary communication channels that are outside of the service provided frame relay network. Such secondary communication links may comprise leased lines, or links established through alternative networks, such as a POTS network or an ISDN network, for example. Furthermore, the system of the invention may include one or more additional access units, wherein the additional access units are interconnected between a frame relay user equipment and another access unit, but not directly connected to the service provided frame relay network. That is, an access unit constructed in accordance with the invention may be interconnected among frame relay user equipment, a service provided network, and one or more other access units (via leased line, ISDN network, POTS network, etc.). However, the plurality of access units that are used to define the inventive system, need not all be interconnected to the service provided frame relay network.

The user-configurable frame relay network of the invention may be configured to provide a fault-tolerant frame relay communications network. In accordance with this aspect of the invention, a method providing fault-tolerant frame-relay communications comprises the steps of establishing a primary communication link between a first user frame relay equipment and a second user frame relay equipment through a service provided frame relay network, diagnosing a failure in the primary communications link, and dynamically establishing a secondary communications link between the first user frame relay equipment and the second user frame relay equipment, and directing further communications between the first and second user frame relay equipment over the secondary communication link.

In accordance with various implementations of the invention, the step of diagnosing a failure in the primary communications link may include diagnosing one or more events, such as detecting a complete failure in the primary communication link, detecting an intermittent failure in the communication link, or detecting dropped packets in the primary communication link. In addition, the preferred embodiment of the invention may be configured to continue testing the primary communication link, even after communications are directed across the secondary link. If and when the primary link is again determined to be in satisfactory working order, further communications between the user frame relay equipment may again be directed across the primary communications link.

In accordance with yet a further aspect of the present invention, a computer readable storage medium may be provided for controlling the operation of a multi-port frame relay access unit that is interposed between a first user frame relay equipment and a second user frame relay equipment for frame relay communications therebetween. In accordance with this aspect of the invention, the computer readable storage medium includes means for establishing a primary communication link between a first user frame relay equipment and a second user frame relay equipment through a first port of the multi-port frame relay access unit, the primary communication link passing through a service provided frame relay network. It also includes means for diagnosing a failure in the primary communications link. It further includes means for dynamically establishing a secondary communications link between the first user frame relay equipment and the second user frame relay equipment through a second port of the multi-port frame relay access unit, and for directing further communications between the first and second user frame relay equipment over the secondary communication link.

It is contemplated that the functionality of the computer readable storage medium will generally be carried out utilizing a general purpose hardware configuration, with the specific features being implemented in software. Notwithstanding, the various means elements may be implemented in specially configured hardware, software, or a combination of the two.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 9A–9C are diagrams illustrating example diagnostic transmissions in accordance with the illustrated embodiment;

Figure 1:
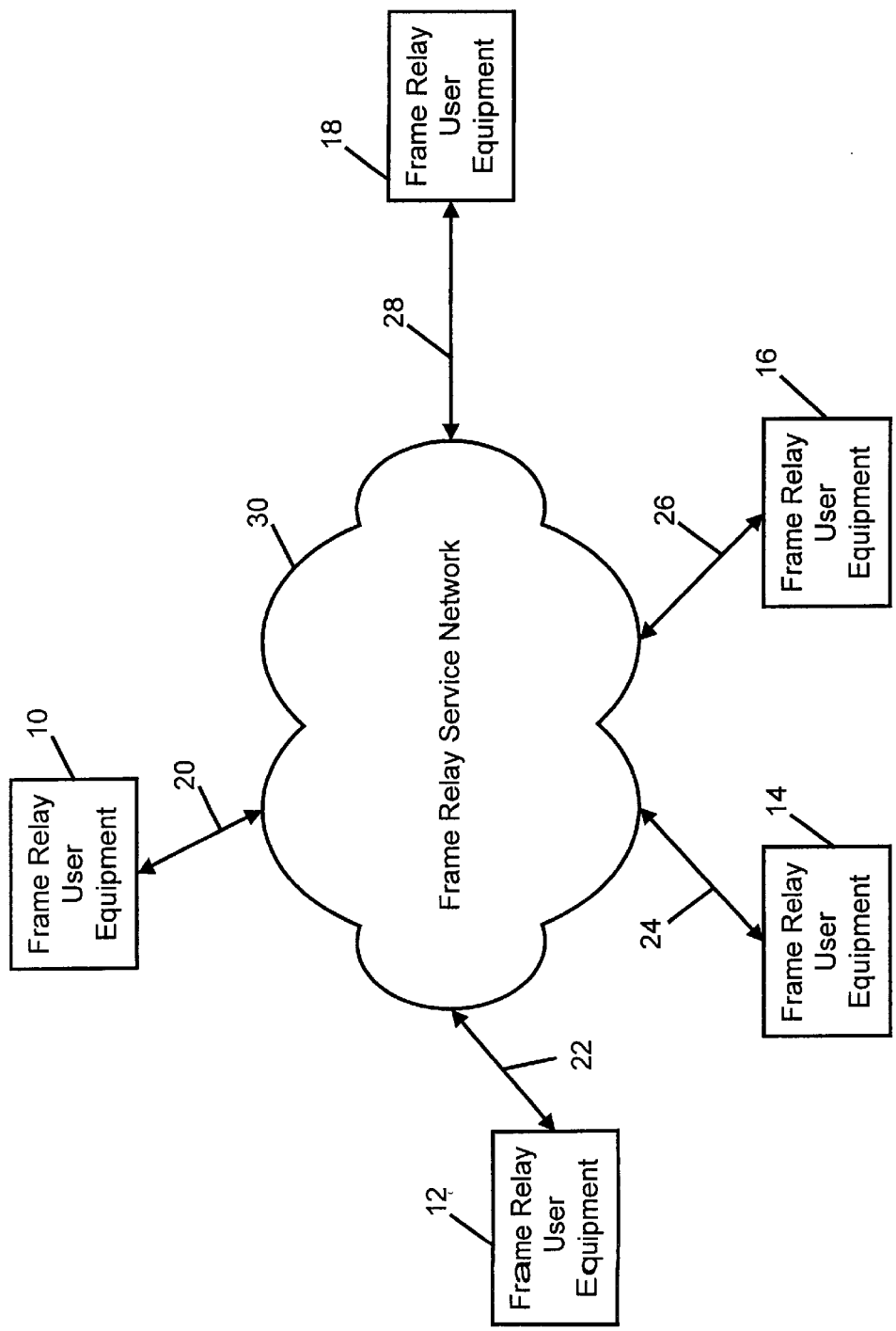
FIG. 1 is a diagram illustrating frame relay communication across a service provided network, as is known in the prior art.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Turning now to the drawings, FIG. 1 illustrates the interconnection of various frame relay user equipment through a frame relay service network. As designated in the figure, such a system is well known in the prior art. Broadly, the system includes a plurality of frame relay user equipment (i.e., device(s) that communicate in frame relay format) 10, 12, 14, 16, and 18 that intercommunicate across communication links 20, 22, 24, 26, and 28 through a frame relay service network 30. As is known, the frame relay service network 30 comprises essentially a mesh of network links (not shown) interconnecting a matrix of intermediate nodes (not shown). Information (which includes both voice and data) is communicated across a frame relay network in discrete packets, which may be time-multiplexed across shared or common communication links. For example, frame relay user equipment 12 may communicate with frame relay user equipment 18 across a predefined communication path or link within the frame relay service network 30. This communication link will generally be defined by a plurality of intermediate nodes. In similar fashion, frame relay user equipment 12 may communicate with frame relay user equipment 16 across a similarly defined communication link. The communication link that interconnects user equipment 12 with user equipment 18 may be completely separate and distinct from that which interconnects user equipment 12 and user equipment 16. Alternatively, a segment of the two above-described communication links may be shared.

Whether the links described above are separate or shared, is a function of a number of factors, and generally is determined by the service provider. Indicia such as usage and congestion across the frame relay service network 30 are primary factors in determining the definition of the various interconnecting communication links. However, since these things are not concerned with the implementation of the present invention, they will not be discussed herein.

As is known, a communication path or link that is defined between user equipment 12 and user equipment 18 will be the same in both directions. That is, data transmitted from user equipment 12 to user equipment 18 will traverse the same path (i.e., interconnecting, intermediate nodes) as will data communicated from user equipment 18 to user equipment 12. This data path of intermediate nodes is defined by DLCI's, and is commonly referred to as a permanent virtual circuit (PVC). This name derives from the fact that the circuit is permanent in that it does not change from transmission to transmission. It is, however, virtual in the sense that a unitary physical connection (such as a leased line) is not established and maintained between the two end points. If for some reason or another, the service provider decides to change the interconnecting path (i.e., reconfigure or redefine the intermediate nodes), the service provider will communicate this changed communication path to the users and a new set of DLCI's will be used in order to properly route the data from end point to end point.

The system configuration illustrated in FIG. 1 is actually a second-generation frame relay system. As is known, in the early days of frame relay or packet switching technology, frame relay service provided networks were not yet available. In these very early systems, frame relay user equipment would be directly interconnected by way of, for example, a leased line. If it was desired to interconnect more than two dedicated frame relay user equipment end points, additional user equipment could be added by way of a frame relay switch (not shown). For example, a first and second frame relay user equipment may be connected at one end to a frame relay switch, for communication to a third frame relay user equipment, disposed at a distant end. By switching between the first and second frame relay user equipment, the frame relay switch would direct data traffic accordingly.

As noted in the background, in the event that a fault or other problem arises in the communication link between two communicating frame relay user equipment devices, communication across the frame relay service network is stalled, often until such time as the service provider can be contacted and make arrangements to reconfigure the service network to provide an alternative route or path for data communications. This delay, however, is undesirable, and represents a significant shortcoming in the prior art systems. The present invention addresses this and other shortcomings noted in the prior art, by providing a user-configurable frame relay network that surrounds, and can therefore circumvent, the frame relay service network.

Figure 2:
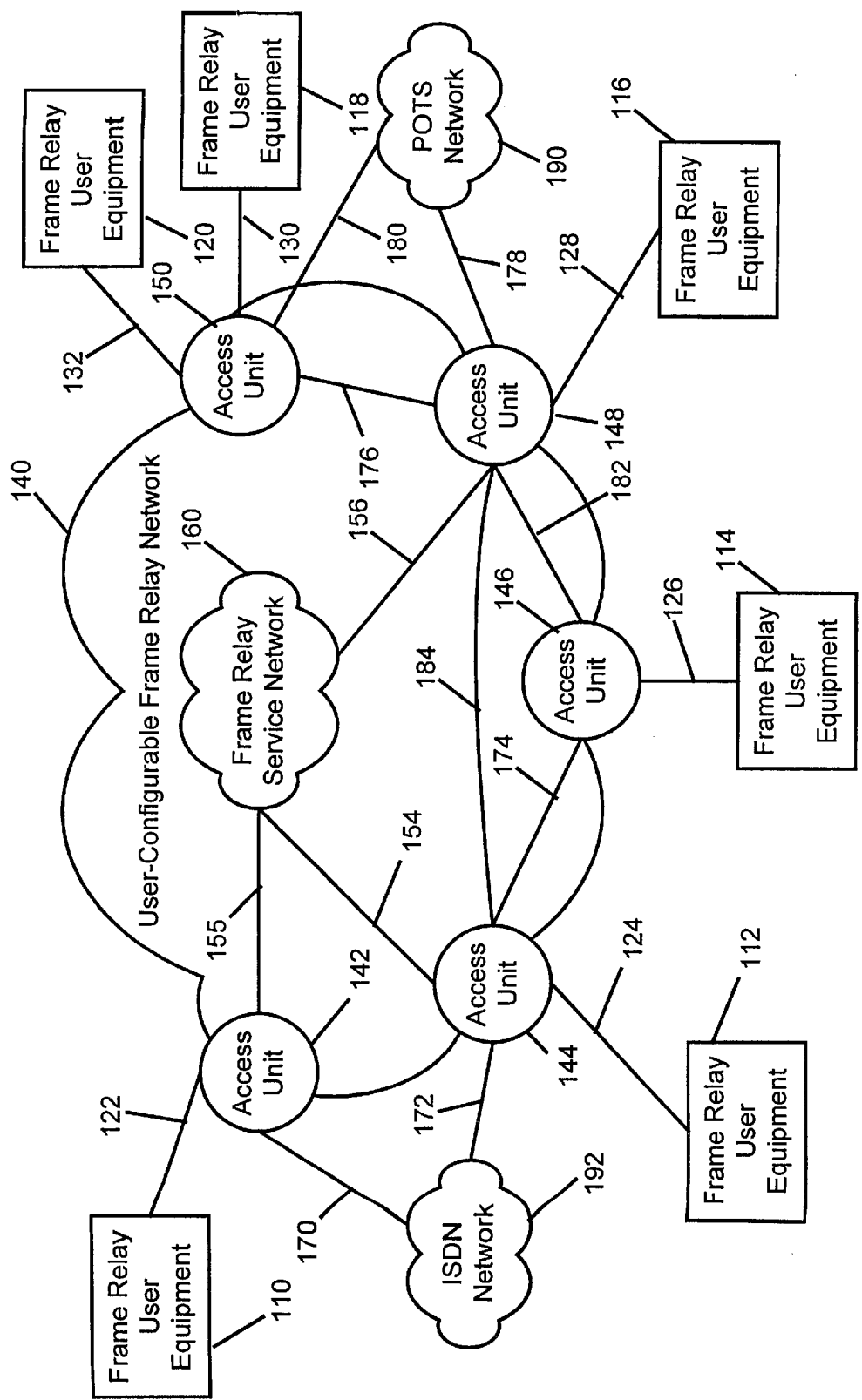
FIG. 2 is a diagram illustrating frame relay communication across a user-configurable network, in accordance with the present invention.

To illustrate the broad concepts and application of the present invention, reference is now made to FIG. 2, which illustrates a user configurable network. As shown, the network includes various frame relay user equipment 110, 112, 114, 116, 118, and 120 that intercommunicate across links or communication paths including segments 122, 124, 126, 128, 130, and 132. As will be further described below, the frame relay user equipment intercommunicate through a user-configurable frame relay network 140 by way of a plurality of access units 142, 144, 146, 148, and 150. Also, as illustrated, within the user-configurable frame relay network 140, a frame relay service network 160 (like the frame relay service network 30 of FIG. 1) is included. In this way, and as will be described, frame relay user equipment may communicate through the frame relay service network 160 in a manner known in the prior art. Alternatively, frame relay user equipment may intercommunicate outside the frame relay service network 160.

By way of example, frame relay user equipment 112 may intercommunicate with frame relay user equipment 116 across a primary communication link, which includes segments 154 and 156. Specifically, frame relay user equipment 112 is directly interconnected with an access unit 144, which is constructed in accordance with the concepts and teachings of the present invention. The access unit 144 is in communication with frame relay service network 160 by way of communication link or segment 154. In similar fashion, frame relay user equipment 116 is in direct connection with access unit 148 by way of communicating link 128. Access unit 148 is in communication with frame relay service network 160 by way of communication link or segment 156. The components and communication path just describe constitute a primarily communication link. It is across this link that communications between user equipment 112 and user equipment 116 will preferably traverse.

In a manner as described in connection with FIG. 1, the frame relay service network 160 will include a plurality of intermediate nodes (not shown) that define a communication path between segments 154 and 156 within the network 160.

In a manner that will be described in more detail below, a significant aspect of the present invention is the ability of a system, configured in accordance with the teachings of the invention, to circumvent the frame relay service network 160, in response to, for example, the detection of a fault or other communication error. In this regard, a plurality of secondary communication links 170, 172, 174, 176, 178, 180, 182 and 184. Suppose, for example, that frame relay user equipment 112 is intercommunicating with fame relay user equipment 116 across a primary communication link, including segments 154 and 156. Further assume that, in a manner that may be known in the art or in a manner that will be discussed in further detail below, access unit 144 detects a failure or a fault in the primary communication link. This fault could be a complete failure in the communication channel, or alternatively, could be manifested in one or more intermittently dropped packets. In this regard, the term failure represents something of an amorphous term insofar as it is user-definable. That is, a single dropped packet is technically a failure. However, it is known that in frame relay communications, even during normal operation, there will be (statistically) a finite number of intermittently dropped or lost packets. Therefore, a failure in the communication link will typically be manifest or quantized in something that is over and above the normal or expected statistical failure. Nevertheless, a particular definition of the threshold, as to what precisely constitutes a failure, is not pertinent for purposes of understanding the concepts in teachings of the present invention, and therefore will not be discussed herein.

In keeping with the example, once access unit 144 has detected or diagnosed a failure in the primary communication link, it may establish a secondary communication link 184 with access unit 148. Thereafter, the communications between access units 144 and 148 will be directed across secondary link 184. However, and in furtherance to the preferred embodiment of the present invention, access unit 144 and/or 148 may continue to test the primary communication link, including segments 154 and 156, through the frame relay service network 160. Upon detection that the failed condition has been alleviated, the access units 144 and 148 may again direct all communication between frame relay user equipment 112 and 116 across the primary communication link. It will be appreciated that the secondary communication link 184 may comprise a leased line.

Alternatively, in environments that cannot justify, or do not wish to justify, the cost of maintaining a leased line as a backup, secondary communication links may be established either by way of, for example, a pots network 190, or an ISDN network 192. While the POTS network 190 is illustrated as interconnecting access units 148 and 150, it will be appreciated that any access unit having dialed access to a telephone network could intercommunicate with any other access unit having similar access. Therefore, in the example previously described, access unit 144 could alternatively establish a secondary communication link with access unit 148 by way of POTS network 190. Further still, assuming access unit 148 had a port and line supporting ISDN access, access unit 144 could establish a secondary communication link with access unit 148 by way of an ISDN network 192.

What is significant for purposes of the present invention, is that through multi-ported access units 142, 144, 146, 148, and 150, a user-configurable frame relay network 140 may be defined, having much greater flexibility and dynamic allocation and reallocation, than the traditional frame relay service provided network 160. However, by encapsulating the service network 160 within the user-configurable network 140 (by way of links including 154, 155, and 156), the benefits of the service provided network 160 are obtained.

Figure 3:
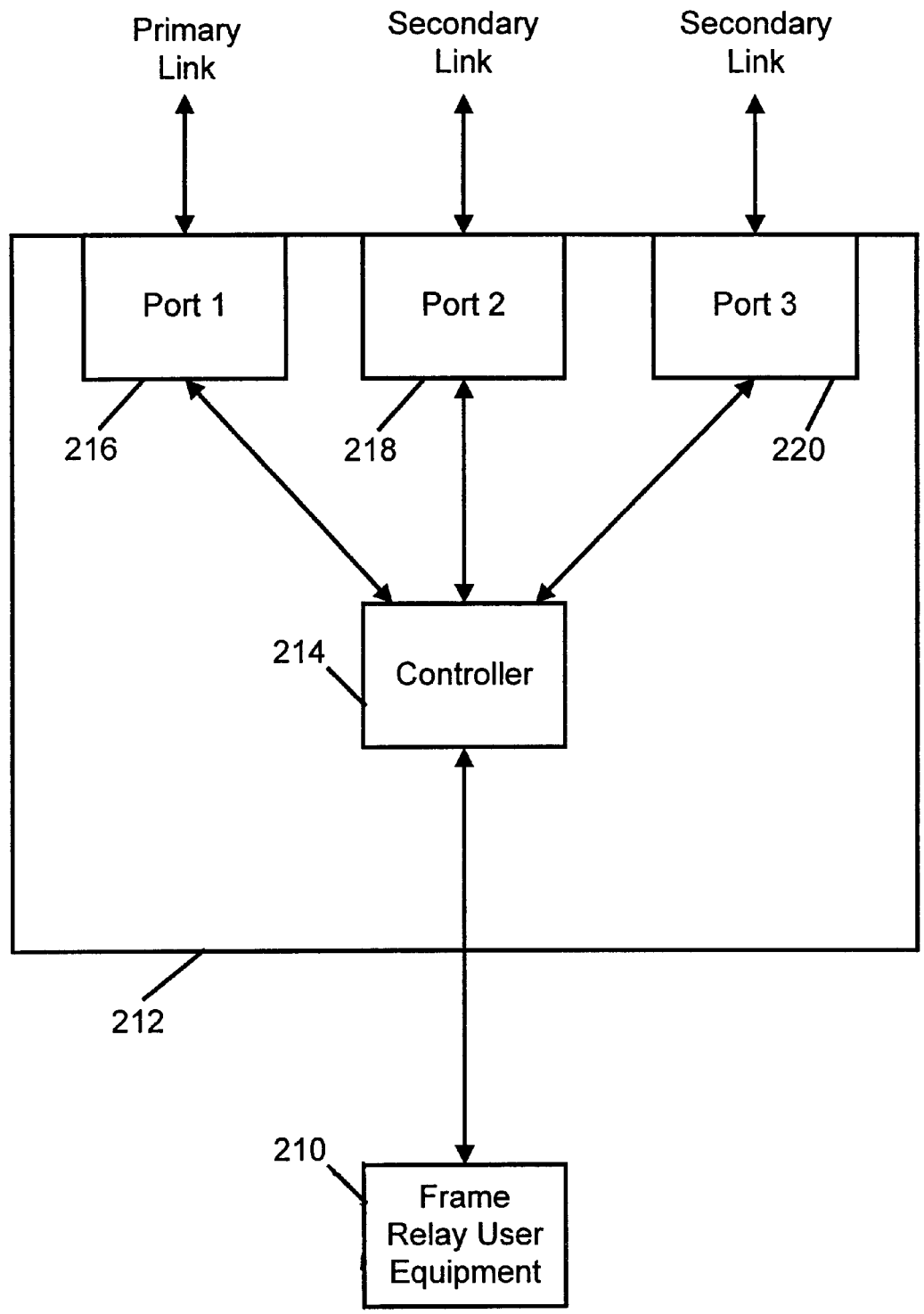
FIG. 3 is a block diagram illustrating principal component layout of an access unit constructed in accordance with the present invention.

Reference is briefly made to FIG. 3, which illustrates a very top-level conceptual view of a multi-ported access unit of the present invention. Specifically, the access unit 212 is illustrated as having three ports, port one 216, port two 218, and port three 220.

Port one is illustrated as being the communication port for the primary communication link, while ports two and three 218 and 220, define communication ports for secondary communication links. A controller 214 channels the communication between the operative port and a frame relay user equipment 210. Initially, communications between frame relay user equipment 210 and a distant frame relay user equipment (not shown) may be directed by a controller 214 through port one 216. If, however, at some time later the access unit 212 detects or is alerted to a failure in the primary communication link, it will then redirect communication from the frame relay user equipment 210 through an alternative port, such as port two 218 or port three 220 to the distant user equipment. It will be appreciated that additional communication ports may be provided, as needed.

Figure 4:
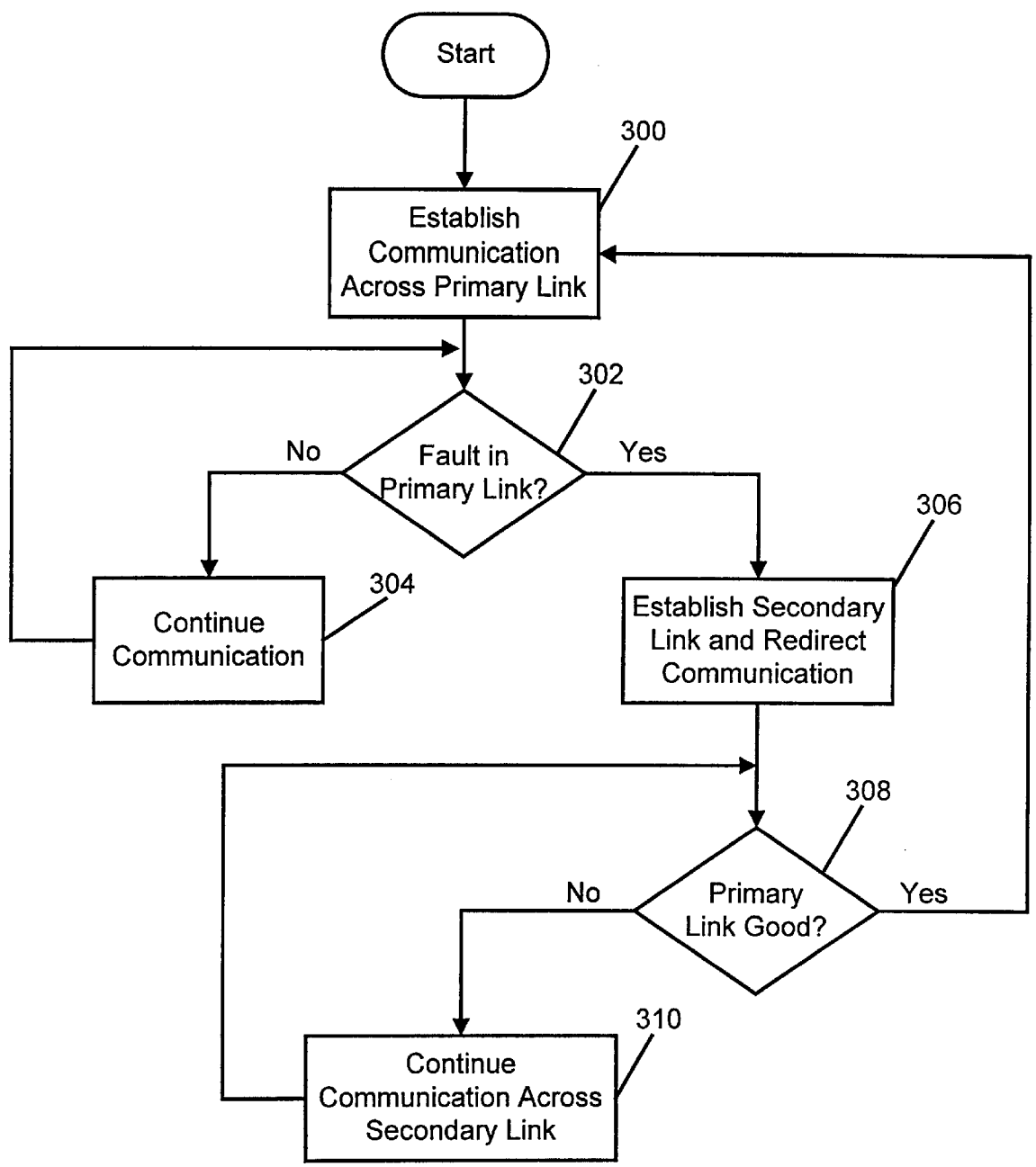
FIG. 4 is a software flowchart illustrating the top-level operation of a system constructed in accordance with the invention.

Reference is now made to FIG. 4, which is a software flowchart illustrating the top-level operation of an access unit constructed in accordance with the present invention. Broadly, upon the beginning of a data communication between frame relay user equipment, the invention establishes such communication across a primary communication link (step 300). The invention then, during the course of communication between the two end points, periodically tests or otherwise monitors the primary communication link to detect faults or failures therein. If no fault is detected in any primary communication link, communications will continue across that link (step 304). If, however, a fault or failure is detected in the primary communication link, the invention will establish a secondary communication link and redirect data across that link (step 306). Nevertheless, in accordance with a preferred embodiment of the present invention, the system will continue to test the condition of the primary communication link (step 308). As long as the primary communication link is diagnosed as having a faulted or failed condition, communications will continue to be routed or directed across the secondary link (step 310). If and when the primary communication link is determined to be in satisfactory condition, then further communications will be redirected across the primary link (return to step 300).

Having described a user-configurable network, in accordance with the concepts and teachings of the present invention, it will be appreciated that the various interconnections between and among the plurality of access units which comprise the network are quite varied, depending upon the desired application. Furthermore, it will be appreciated that there are a variety of uses for such a dynamically reconfigurable network. For example, if an extremely high data transmission rate is desired (for a period of time) between two frame relay user equipment 116 and 120, then access units 148 and 150 may employ their direct connection 176 for communication, rather than communicating across the service provided network 160.

Alternatively, and as previously mentioned, an error or fault condition detected in the primary communication link of the service network 160 may trigger an access unit to reconfigure the system to utilize a secondary communication link, in place of the primary link. The discussion that follows is directed to an exemplary system and method for diagnosing such faults or failures in the primary communication link, and thus to a system and method that may be used to trigger the reconfiguration of a networked system, constructed in accordance with the present invention.

Figure 5A:
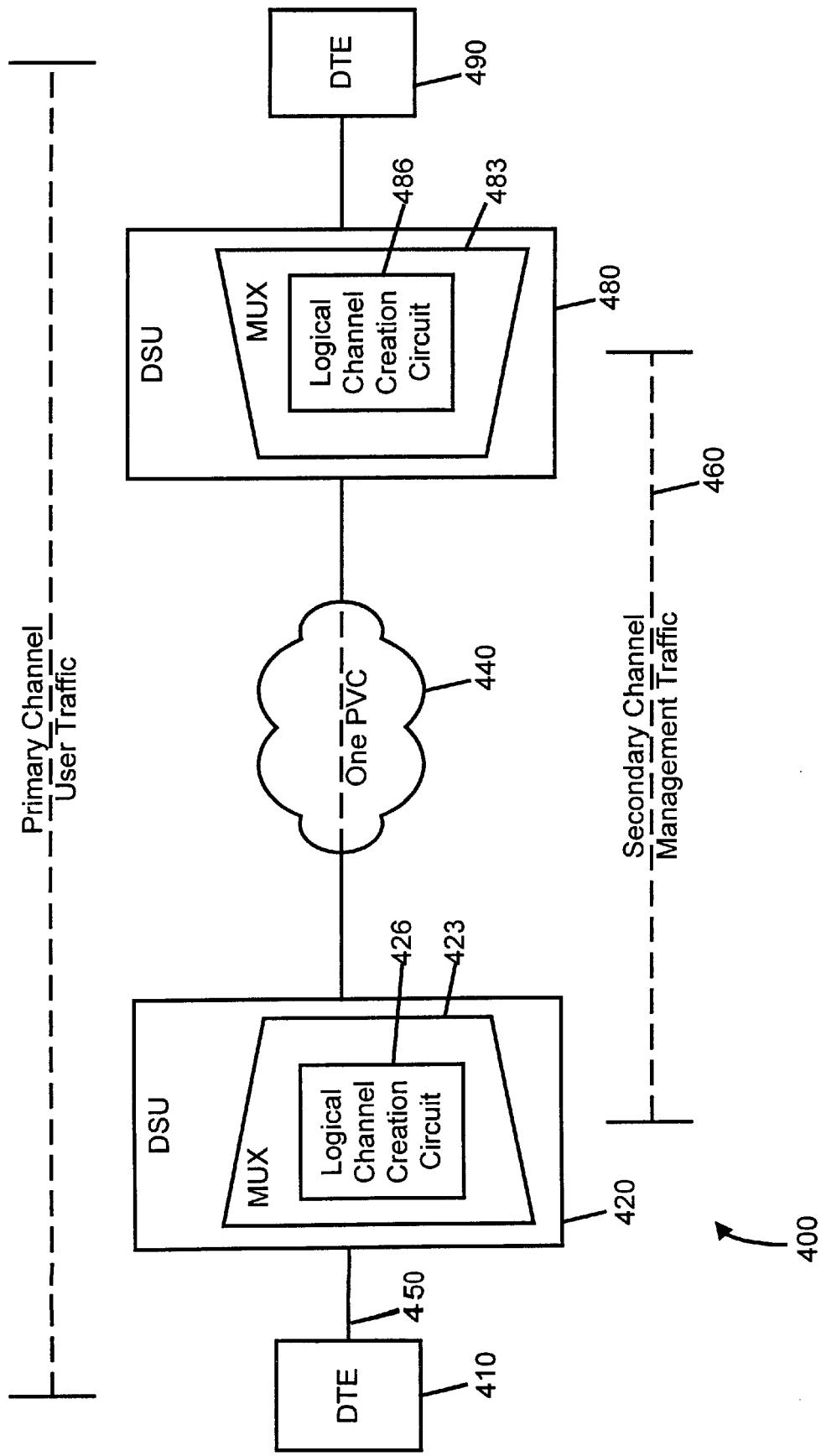
FIG. 5A is a system diagram illustrating a frame relay or packet switching network illustrating the multiplexing of user and management channels.

Referring now to FIG. 5A, a system diagram illustrates a frame-relay or packet-switching network 400 that multiplexes two or more logical connections over a single permanent virtual circuit. The network 400 includes a first data terminal equipment (DTE) 410 coupled to a first data service unit (DSU) 420 communicating across a single frame-relay virtual circuit 440 with a second DSU 480 coupled to a second DTE 490. While the network 400 is illustrated with only a pair of DSUs 420, 480, the network 400 may be a part of a much larger telecommunications network. Also, while the first and second DSUs 420, 480 are illustrated servicing the first and second DTEs, 410, 490, respectively, the first and second DSUs 420, 480 are equipped to service multiple DTEs. The single frame-relay virtual circuit 440 includes a primary channel 450 and a plurality of secondary channels 460. The illustrated embodiment provides a multiplexing circuit and method for providing end-to-end data management of the primary and secondary channels 450, 460, respectively, over the single frame-relay virtual circuit 440.

In the illustrated embodiment, the first and second DSUs 420, 480 contain first and second multiplexing circuits 423, 483, respectively. The multiplexing circuits 423, 483 include logical channel creation circuits 426, 486, respectively, for designating a channel flag and first and second headers to be associated with frames relayed via the primary and secondary channels 450, 460. This mode of operation is referred to as a virtual secondary channel mode due to the fact that the logical channel creation circuits 426, 486 designate the logical channels (i.e. first and second logical channels) as primary and secondary channels 450, 460, respectively.

The multiplexing circuits 423, 483 also include multiplexers for associating frames of first and second data streams with the primary and secondary channels, 450, 460, respectively. In the illustrated embodiment, the first and second data streams emanate from the first and second DTEs 410, 490, respectively. The illustrated embodiment, however, is preferably transparent to the DTEs 410, 490. The multiplexing circuits 423, 483 insert the second header into each frame of the second data stream associated with the secondary channel 460 and the first header into only frames of the first data stream associated with the primary channel 450 for which the associated flags match the channel flag, the primary and secondary channels 450, 460 are multiplexed over the single frame-relay virtual circuit 440 with ones of the frames of the first data stream free of the first header to reduce an overhead of the multiplexing circuits 420, 480. As a result of a judicious choice of the channel flag, the first data stream is relatively free of additional overhead, while the second data stream bears the bulk of the additional overhead.

"Overhead," for purposes of this disclosure, is defined as additional first virtual channel overhead incurred by virtue of bits added to multiplex according to the illustrated embodiment. The major factors that influence overhead are: (1) the selected channel flag value and (2) the nature of use of the first octet in the data streams of a frame. Communication protocols commonly place protocol headers in the first several octets of a frame, with the first octet often containing a predictable value. IETF RFC 1490, for example, specifies the first octet of every frame as the control field that may only contain one of three possible values: 0x03, 0xaf or 0xbf. With any flag value outside of these three possibilities, zero overhead is guaranteed.

In most cases, given a well-selected channel flag value, the overhead imposed by this method is expected to be at or near zero. The first encapsulation method uses a Network Level Protocol Identification ("NLPID") of 0xcc, indicating an implementation of an Internet Protocol ("IP"), for a header size of two octets, it is assumed that one additional octet is required for equivalent discrimination capabilities for a total overhead of three octets. The second method uses an NLPID of 0x80, indicating an implementation of a Subnetwork Access Protocol ("SNAP"), for a header size of eight octets.

The multiplexing circuit and method of the illustrated embodiment substantially decrease the overhead associated with the primary channel 450 of the single frame-relay virtual circuit 440.

Furthermore, in this mode of operation, the first data stream, associated with the primary channel 450, is subject to a more stringent performance requirement than the second data stream, associated with the secondary channel 460. The multiplexing circuits 429, 489, also allow the single frame-relay virtual circuit 440 to relay the secondary channel 460. Finally, the primary channel 450 may be employed, for instance, to carry user traffic, while the secondary channel 460 may be employed, for instance, to carry management traffic.

Figure 5B:
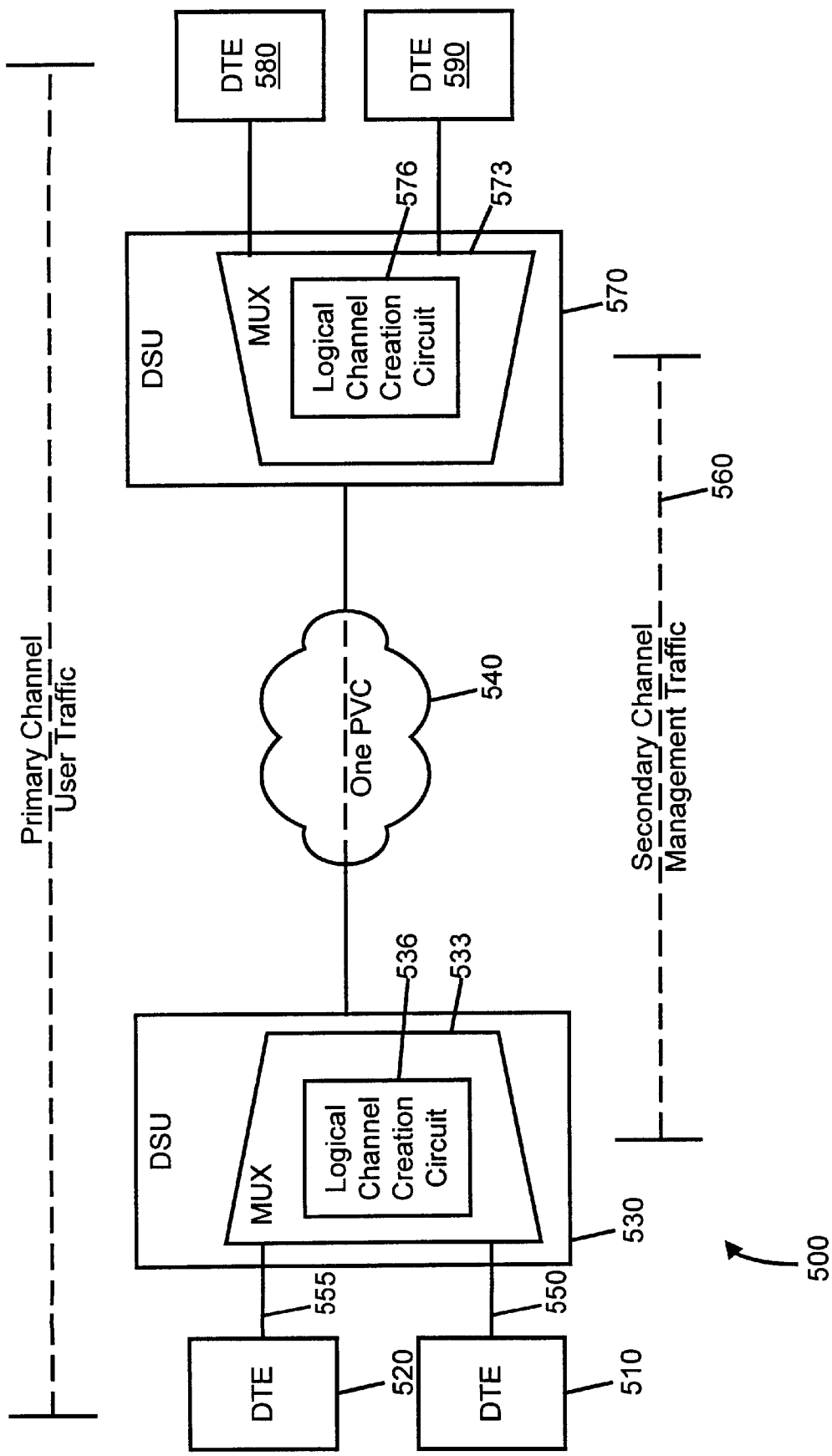
FIG. 5B is a system diagram similar to FIG. 5A, but illustrating additional primary user channels.

Turning now to FIG. 5B, a system diagram illustrates an alternative embodiment of a frame-relay or packet-switching network 500. The network 500 comprises first and second DTEs 510, 520 coupled to a first DSU 530 communicating across a single frame-relay virtual circuit 540 with a second DSU 570 coupled to third and fourth DTEs 580, 590. Again, while the network 500 is illustrated with only a pair of DSUs 530, 570, the network 500 may be a part of a larger telecommunications network capable of employing the frame-relay virtual circuit 540 of the network 500. Also, while the first and second DSUs 530, 570 are illustrated servicing the first, second and third, fourth DTEs, 510, 520, 580, 590, respectively, the first and second DSUs 530, 570 are equipped to service multiple DTEs. The single frame-relay virtual circuit 540 comprises a native primary channel 550, a plurality of primary channels 555 and a plurality of secondary channels 560. The illustrated embodiment provides a multiplexing circuit and method for providing end-to-end data management of the native primary, primary and secondary channels 550, 555, 560, respectively, over the single frame-relay virtual circuit 540.

In the illustrated embodiment, the first and second DSUs 530, 570 contain first and second multiplexing circuits 533, 573, respectively. The multiplexing circuits 533, 573 include logical channel creation circuits 536, 576, respectively, for designating a first and second channel flags and first, second and third headers to be associated with frames relayed via the native primary, primary and secondary channels 550, 555, 560 over the single frame-relay virtual circuit 540. This mode of operation is referred to as a virtual circuit multiplexing mode due to the fact that the logical channel creation circuits 536, 576 designate the logical channels (i.e. first, second and third logical channels) as native primary, primary and secondary channels 550, 555, 560, respectively.

The multiplexing circuits 533, 573 also include multiplexers for associating frames of first, second and third data streams with the native primary, primary and secondary channels, 550, 555, 560, respectively. In this illustrated embodiment, the first, second and third data streams emanate from the first, second, third and fourth DTEs 510, 520, 580, 590. The illustrated embodiment, however, is preferably transparent to the DTEs 510, 520, 580, 590. The multiplexing circuits 536, 576 insert the second header into each frame of the second data stream associated with the primary channel 555, the third header into each frame of the third data stream associated with the secondary channel 560 and the first header into only frames of the first data stream associated with the native primary channel 550 for which the associated flags match the first channel flag. The native primary and primary channels 550, 555 are multiplexed over the single frame-relay virtual circuit 540 with ones of the frames of the first data stream free of the first header to reduce an overhead of the multiplexing circuits 530, 570. As a result of a judicious choice of the first channel flag, the first data stream is relatively free of additional overhead, while the second and third data streams bear the bulk of the additional overhead. Analogous to the virtual secondary channel mode described with respect to FIG. 5A, the multiplexing circuit and method of the illustrated embodiment substantially decrease the overhead associated with the native primary channel 550 of the single frame-relay virtual circuit 540.

In the virtual circuit multiplexing mode, the first data stream, associated with the native primary channel 550, is subject to a more stringent performance requirement than the second data stream, associated with the primary channel 555. Additionally, the multiplexing circuits 539, 579 allow the single frame-relay virtual circuit 540 to act as multiple frame-relay circuits. The native primary and primary channels 550, 555 may be employed, for example each to carry user traffic, while the secondary channel 560 may be employed, for instance, to carry management traffic. This mode of operation, therefore, provides the ability to multiplex two or more primary channels on a given frame-relay circuit, along with one or more secondary channels.

Figure 6:
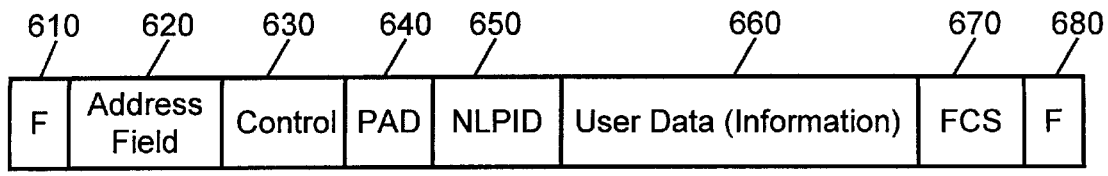
FIG. 6 is a diagram illustrating a data frame suitable for transmission over the packet-switching network of FIGS. 5A or 5B.

Turning now to FIG. 6, illustrated is a data frame 600 suitable for transmission over the packet-switching networks 400, 500 of FIGS. 5A or 5B, respectively. While the illustrated data frame 600 is formatted in a Q.922 frame, other frame formats compatible with a frame-relay network are well within the scope of the illustrated embodiment. The data frame 600 comprises a first flag field 610, an address field 620, a control field 630, a pad field 640, a NLPID field 650, a user information field 660, a frame check sequence ("FCS") field 670 and second flag field 680.

The first and second flag fields 610, 680 signify the beginning and the end of the data frame 600. The address field 620 provides the destination in a frame-relay network (e.g. the first DTE 410 coupled to the first DSU 420 in FIG. 5A) for the data frame 600 to travel across a single frame-relay virtual circuit. The control field 630 identifies control information for the Q.922 format. The value of the control field 630 is typically 0x03 for a Q.922 frame unless negotiated otherwise. The pad field 640 is used to align the remainder of the frame to a two octet boundary. There may be zero or one pad octet within the pad field 640 and, if present, must have a value of zero. The NLPID field 650 is administered by the International Standards Organization ("ISO") and the Consultative Committee International Telegraph & Telephone (now the International Telecommunication Union—ITU). It contains values for many different protocols including, for instance, the Internet Protocol ("IP") and the Institute of Electrical and Electronics Engineers Subnetwork Access Protocol ("IEEE SNAP"). The NLPID field 650 relates to the receiver the protocol that is being used by the data frame 600.

A data portion of the user information field 660 carries the substantive data (i.e. the first, second or third data streams) between destinations in the frame-relay network. Additionally, a first and second octet of the user information field 660 carries the first or second channel flags and the first, second or third headers, when necessary, generated by the logical channel creation circuit of the illustrated embodiment Finally, the FCS field 670 assures the data integrity of the data frame 600.

There is no single implemented frame size for the data frame 600 in a frame-relay network. Generally, the maximum will be greater than or equal to 1600 octets, but each frame-relay provider will specify an appropriate value for its network. A DTE in a frame-relay network, therefore, must allow the maximum acceptable frame size to be configurable. Conversely, the minimum frame size allowed for the data frame 600 in a frame-relay network is five octets between the first and second flag fields 610, 680 assuming a two octet address field 620. This minimum increases to six octets for a three octet address field 620 and seven octets for a four octet address field 620.

Figure 7:
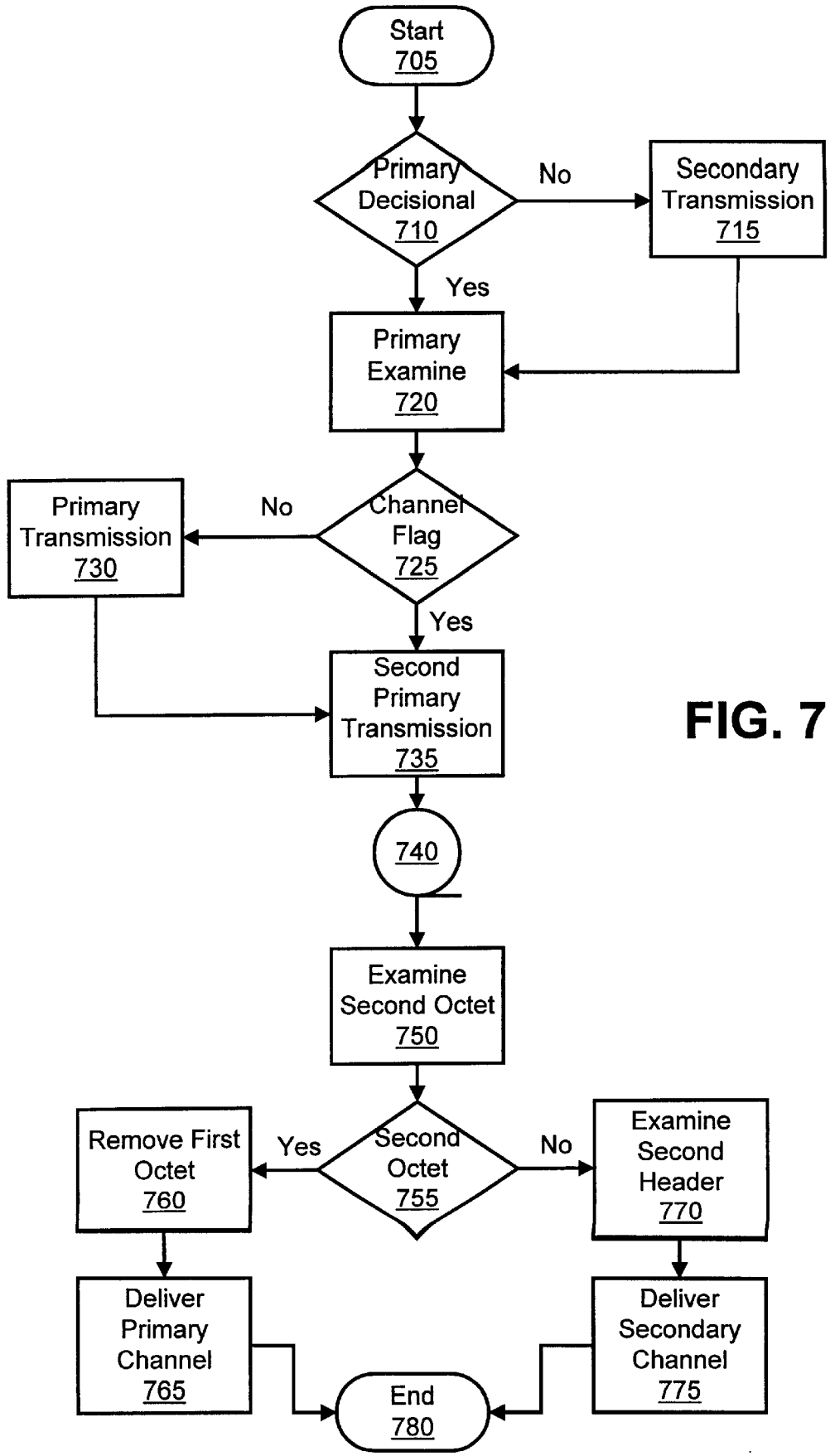
FIG. 7 is a software flowchart illustrating the method of multiplexing the user and management channels of FIGS. 5A and 5B.

Turning now to FIG. 7, illustrated is a flow diagram of a method of the illustrated embodiment according to the embodiment of FIG. 5A. Again, FIG. 5A illustrates the virtual secondary channel mode whereby the logical channel creation circuits 426, 486 designate the logical channels as primary and secondary channels 450, 460, respectively. With continuing reference to FIGS. 5A and 6, the virtual secondary channel mode of operation will now be explained in greater detail.

The virtual secondary channel mode of operation commences at a start step 705. In a primary decisional step 710, it is determined if the user information 660 emanates from the primary or secondary channel 450, 460. If the data frame 600 is a secondary frame, then the method proceeds to a secondary transmission step 715, otherwise the method proceeds to a primary examine step 720. At the secondary transmission step 715, both the channel flag and the second header are appended to the second data stream in the user information field 660 and the data frame 600 is transmitted on the secondary channel 460 from the first DSU 420 to the second DSU 480 across the single frame-relay virtual circuit 440.

At the primary examine step 720, the first octet in the user information field 660 of every primary frame is examined prior to transmission. At a first channel flag decisional step 725, it is determined if the first octet is equal to the channel flag, generated by the logical channel creation circuit of the illustrated embodiment. If the first octet is not equal to the channel flag, the primary frame is transmitted over the primary channel 450 without modification in a primary transmission step 730. If the first header is equal to the channel flag, one additional octet containing the channel flag is appended to the user information field 660 of the data frame 600 prior to transmitting the primary frame over the primary channel 450 in a second primary transmission step 735. A connector 740 illustrates a transition between the transmission and reception side of the frame-relay network 400.

Upon frame receipt, the first octet of the data frame 600 is equal to the channel flag and the second octet is thereafter examined in an examine second octet step 750. At a second octet decisional step 755, it is determined if the second octet is equal to the channel flag. If the second octet is equal to the channel flag, the first octet is removed, at a remove first octet step 760. Then, the data frame 600 is delivered on the primary channel 450, at a deliver on primary channel step 765 and the method ends at an end step 780. If the second octet is not equal to flag, the second header is examined, at an examine second header step 770. Then, the data frame 600 is delivered at the secondary channel 460, at a deliver secondary channel step 775 and the method ends at the end step 780.

The virtual circuit multiplexing mode, demonstrated with respect to FIG. 5B, functions in a manner similar to the virtual secondary channel mode. The virtual circuit multiplexing mode extends the use of the channel flag/header to one or more multiplexed primary channel frames. The channel flag is used to discriminate native primary channel frames. The headers are used to discriminate among multiplexed primary channels and secondary channels.

Utilizing the system and method described above, the illustrated embodiment is directed to a novel method and system for performing diagnostics. Specifically, the illustrated embodiment dedicates or reserves one of a plurality of logical channels that are multiplexed upon a single virtual circuit. This reserved channel is used exclusively for diagnostics, and in this way operates non-disruptively with the rest of the user traffic across the virtual circuit. It will be appreciated that, in accordance with the multiplexing system and method described above, since dedicated time slots are not reserved for the various logical channels, the channels are said to be "statistically" multiplexed on a single virtual circuit. Therefore, at times when diagnostic commands and messages are not being exchanged across the virtual circuit, more bandwidth is available for other user or data traffic.

Figure 8:
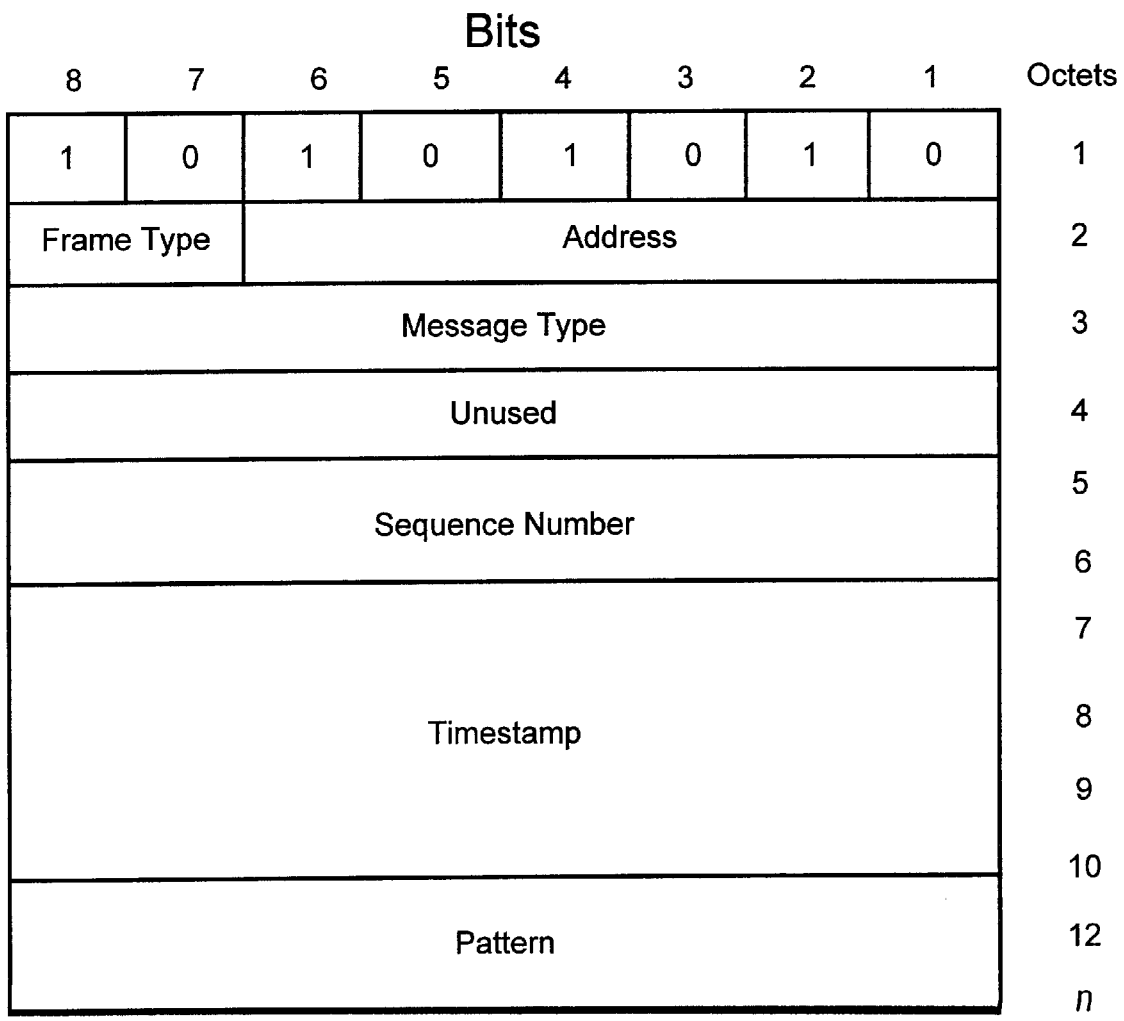
FIG. 8 is a diagram illustrating a frame format for transmission over a diagnostic channel defined in accordance with the illustrated embodiment.

Referring now to FIG. 8, a preferred frame format for messages transmitted across the diagnostic channel is shown. As illustrated, the preferred frame format is of variable octet length, depending in part upon the type of test being executed. For example, whether the test is a connectivity test, a loopback test, or a pattern test, and further whether pattern or other information is being transmitted as a part of the message. The first two octets define the multiplexing header. The frame type, of octet 2, specifies that the present packet is a multiplexed packet. The address, of octet 2, specifies the address that uniquely identifies the reserved or dedicated diagnostic channel. A diagnostic header immediately follows the multiplexing header of octets 1 and 2, and comprises octets 3–10 (preferably). Elements included within the diagnostic header include the message type, sequence number, and timestamp. The message type is used to indicate the type and disposition of the present frame. For example, whether the test is a pattern test, a connectivity test, a loopback test, etc.

In accordance with the preferred embodiment of the illustrated embodiment, various message types and their definitions are identified in Table 1 immediately below.

TABLE 1

| Message Type | Definition |
| --- | --- |
| Pattern Message | Identifies a frame generated by a Send Pattern function |
| Connectivity Request | Identifies a frame generated by a Connectivity Test indicator |
| Connectivity Response | Identifies a frame generated in response to a Connectivity Request |
| Start Send Pattern Command | Commands a far-end access unit to initiate a Send Pattern function |
| Start Loopback Command | Commands a far-end access unit to initiate a Loopback function |
| Start Monitor Pattern Command | Commands a far-end access unit to initiate a Monitor Pattern function |
| Stop Send Pattern Command | Commands a far-end access unit to terminate a Send Pattern function |
| Stop Loopback Command | Commands a far-end access unit to terminate a Loopback function |
| Stop Monitor Pattern Command | Commands a far-end access unit to terminate a Send Pattern function |

Of course, a number will be inserted in the message type field, of octet 3, that corresponds to the various message types listed in the table. In addition, other diagnostic tests, messages, or commands may be provided. As will be appreciated by those skilled in the art, pattern tests transmit a continuous stream of frames having known data values and sequence. A device on the receiving end will be instructed as to the pattern type and sequence, and thus will know the particular pattern of data and sequence that it expects to receive. It can then monitor the pattern data and sequence received over the diagnostic channel to verify whether that channel is, in fact, properly transmitting data. The accurate reception of data will indicate to the receiving unit that the transmission line defined by the virtual circuit is in good and proper working order. Faulty data will be an indication that there is some type of error or system fault along or within the virtual circuit. In accordance with the connectivity test, a hand-shake sequence is performed on the diagnostic channel to determine the state of the virtual circuit, as well as the state of the distant access unit. Typically, a connectivity test is initiated by a user interface, command. A loopback test is typically run in conjunction with a send pattern and/monitor pattern command. When loopback is active on a virtual circuit, all frames received on the diagnostic channel of that circuit are transmitted back to the originating device. The originating device, then, after transmitting a pattern, will monitor the diagnostic channel to evaluate whether the transmitted packet is in fact received. By monitoring the integrity of the received, loopbacked results, the transmitting device can evaluate the condition of the virtual circuit.

In keeping within the description of FIG. 8, a sequence number will typically be utilized for tests in which sequence checking is required. Finally, a time stamp may be used for certain tests, when, for example, calculating the round trip transmission time. The final portion of the frame format illustrated in FIG. 8 is designated as "Pattern". This portion of the frame is utilized in connection with pattern testing in the manner described above, and as will be further described below. It will be appreciated that the illustrated embodiment is directed to the broader feature of the designation or reservation of a multiplexed logical channel for purposes of providing non-disruptive diagnostics. The actual performance and evaluation of the various diagnostic tests are presented herein for purposes of illustration.

As is known in frame relay technology, some errors will invariably be encountered occasionally across any virtual circuit. These errors result from a variety of reasons. Traffic congestion often leads to errors. For example, during a transient time of peek usage, an intermediate node within the frame relay network may become congested with data traffic from various sources. If so much data is received as to fill up the intermediate node's buffer space, the node often, by design, drops packets. Therefore, even during normal operation, and with no physical fault in the data path, a virtual circuit may lose packets. Utilizing the sequence number, a transmitting device may look for acknowledgments of the various packets transmitted. If a return/acknowledgment is received out of sequence, the transmitting device will know that intermediate packets were dropped. In this regard, the permanent virtual circuit of a frame relay differs from other packet transmitting technologies, such as IP routers. In this regard, in a virtual circuit, the same intermediate route is utilized for all data packets transmitted. In contrast, IP routers route data packets based on a number of factors, and, as a result, packets transmitted from a transmitting node to a receiving node through a number of intermediate nodes may not all be transmitted along the same route or succession of intermediate nodes.

In keeping with the discussion of various diagnostic tests which may be utilized in connection with the illustrated embodiment, reference is now made to FIGS. 9A, 9B, and 9C. In this regard, FIG. 9A is directed to a sequence executed in connection with a monitor pattern function. The monitor pattern function is typically executed in conjunction with a send pattern function, and is used to evaluate the sequence, data content, and delivery rate of the received packets. The rate of packet receipt is expected to equal the implementation-specific rate of packet generation used for the send pattern. Accordingly, each frame received on the diagnostic channel is evaluated for conformity to the previously specified frame format. The message type is expected to contain a type of pattern message. The sequence number is expected to contain a value of one for the first frame, and then is sequentially incremented monotomically thereafter, for each subsequent frame. The pattern element is expected to contain the pattern created by the send pattern test. In performing a monitor pattern diagnostics, the monitor pattern function is said to be in synchronization if a predetermined (e.g., implementation-specific) number of packets are received with a valid message type, the expected sequence number, and a validated diagnostic pattern or payload. All of this should occur within a interval of time that is consistent with the implementation-specific rate of packet generation. If any one or more of the foregoing criteria are not met, the monitor pattern function may be deemed to be out of synchronization, thereby indicating a failed condition or fault on the communication link or deterioration of service.

The diagram in FIG. 9A illustrates traffic, not just along the diagnostic channel, but across the virtual circuit in general. In this regard, the second column of FIG. 9A, entitled Address, lists address values of the various data frames. Those entries having an address of 63 (for purposes of illustration) are deemed to be packets transmitted along the diagnostic channel. The corresponding message types for each of these packet transmissions is Pattern Message, and the fourth column, entitled Sequence, provides the sequence number associated with the packets. Immediately to the right of the sequence column, is a column of horizontally directed arrows, which illustrate the transmission of the data across the virtual circuit. The first four columns of the diagram are associated with the transmitting device, while the fifth column (to the right of the arrows) is associated with receiving device. As will be appreciated, the transmitted pattern represents the data packets transmitted from a transmitting device, while the received pattern reflects actions that occur at the receiving device. For example, before the transmissions which are illustrated in FIG. 9A occur, each device (both the transmitting and receiving device) would be commanded into their respective modes of operation. In accordance with the message types and definitions provided in Table 1 above, the receiving device could transmit a command, (across the diagnostic channel) to the transmitting device to start a send pattern command. Alternatively, the transmitting device could transmit a command to the receiving device to start the monitor pattern command. Either of the above-described commands would cause the two end devices to enter the modes for the pattern test operation illustrated in FIG. 9A.

In keeping with the discussion of FIG. 9A, both devices will be synchronized or instructed as to the particular pattern that is transmitted. As is illustrated by the arrows between columns 4 and 5, packet sequence numbers 1, 2, and 3 are all successfully transmitted across the virtual circuit, and therefore the receiving unit indicates valid patterns for each. However, for any of a number of reasons, the packet of sequence number 4 is dropped along the virtual circuit. Since frame relay does not provide individual packet acknowledgments (as does X.25 protocol) the transmitting unit is not aware that the packet is dropped. Likewise, the receiving unit is not aware that the packet is dropped until it receives the packet for sequence number 5. At that time, the receiving unit knowing that the previously received packet was sequence number 3, detects a sequence error. Upon detecting this error, appropriate corrective action may be taken. This further corrective action will not be described in detail herein, as it is outside the scope of the illustrated embodiment. Suffice it to say that the action could comprise sending a message back to the transmitting device to instruct it that an error has occurred, transmitting a message back to the transmitting unit requesting further diagnostics be performed, alerting a system operator that an error was encountered, which system operator may then advise a service provider of the error, or any of a number of other corrective actions may be taken.

FIG. 9B illustrates testing conducted in accordance with a loopback test. Loopback tests are typically run in conjunction with a send pattern and/monitor pattern test. When loopback is active on a virtual circuit, all frames received at the diagnostic channel of that circuit are transmitted back to their originating device. Thus, for example, if a device decides to initiate a diagnostic sequence, it may instruct a far end node to enter into loopback testing, so that the transmitting device may evaluate its own transmission results. Accordingly, in loopback type testing, the receiving node need not be aware of the particular patterns that are transmitted by the transmitting device, since it need not make an independent determination or evaluation of the packets received.

The diagram of FIG. 9B, like that of FIG. 9A, specifies an address of 63 to correspond to the diagnostic channel. The message type for the various diagnostic messages is "Pattern Message". The arrows directed from left to right indicate transmissions from a transmitting device to a receiving device. From the right hand side of the diagram, arrows directed first downwardly, then to the left illustrate the loopback of the transmitted message from the receiving device to the transmitting device. The diagram of FIG. 9B illustrates the same transmission sequences (1, 2, 3, 4, and 5, with 4 being dropped), as were illustrated in FIG. 9A. As in the diagnostic illustration of FIG. 9A, the diagnostic sequence of FIG. 9B does not detect a sequence error until the loopback of pattern message 5 is received by the transmitting device. The reason, at least in this embodiment, is that the transmitting unit will transmit message packet 4, and while monitoring the diagnostic channel for the packet for loopback return, the transmitting device also transmits pattern message 5. However, by receiving the loopback sequence 5 before receiving sequence 4, the transmitting device detects the sequence error, and therefore identifies a fault in the permanent virtual circuit. In an alternative embodiment (not shown) the transmitting device may be configured such that it must receive loopback transmissions before transmitting the next sequence package in the pattern test. If a loopback package is not received within a predetermined period of time (i.e., time out), then the transmitting device would signal a sequence error. In such an embodiment, the transmitting device would have detected the dropped package associated with pattern message sequence 4, before transmitting packet sequence number 5.

In addition to the errors depicted in FIGS. 9A and 9B, errors could also be diagnosed if the pattern received by the receiving device (FIG. 9A embodiment) did not correlate with the expected pattern. Likewise, errors could be diagnosed if the pattern received back by the transmitting device (FIG. 9B embodiment) did correlated with the originally transmitted pattern.

As a final example, reference is made to FIG. 9C, which illustrates the transmissions associated with a connectivity test. When a connectivity function is active on a virtual circuit, a connectivity request frame is transmitted on the diagnostic channel, and a connectivity response frame is awaited. The receiving device, upon receipt of a connectivity request frame, responds with a connectivity response frame. A given connectivity test is said to be successful if a valid connectivity response package is received within a predetermined period of time. When a connectivity response package is received, the test is declared successful. The test is deemed to be unsuccessful if a predetermined period of time passes without receipt of a connectivity response. A successful transmission of this single packet test is illustrated in FIG. 9C. As the name indicates, a connectivity test merely tests the integrity/continuity of the virtual circuit. The pattern test, which extend over a relatively large number of frame packets, provides a better measure of other parameters, such as lost packets, due to congestion or other intermittent errors that may occur in the virtual circuit.

Figure 10:
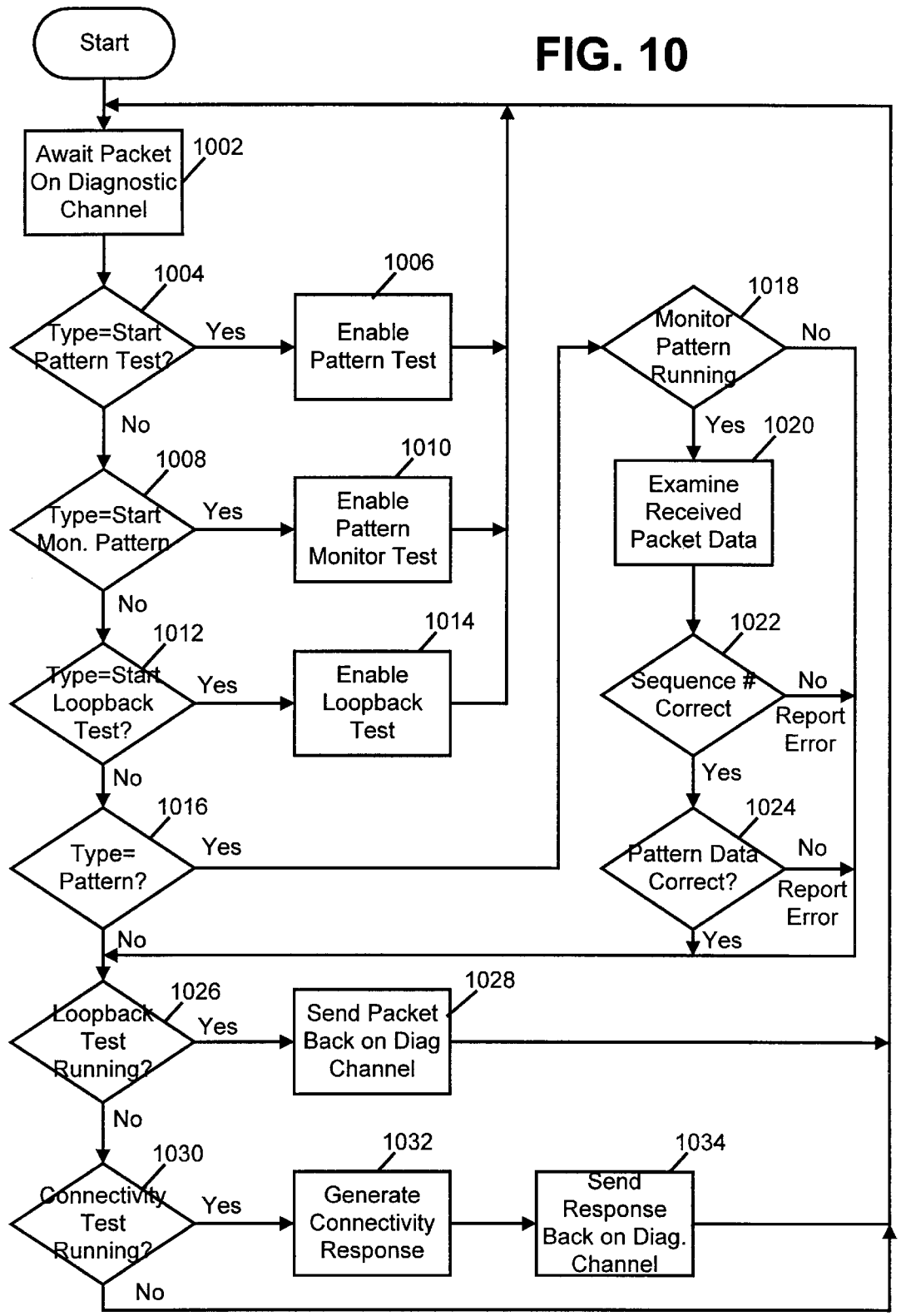
FIG. 10 is a top-level software flowchart illustrating a receiver process for diagnostics in accordance with the illustrated embodiment.
Figure 11:
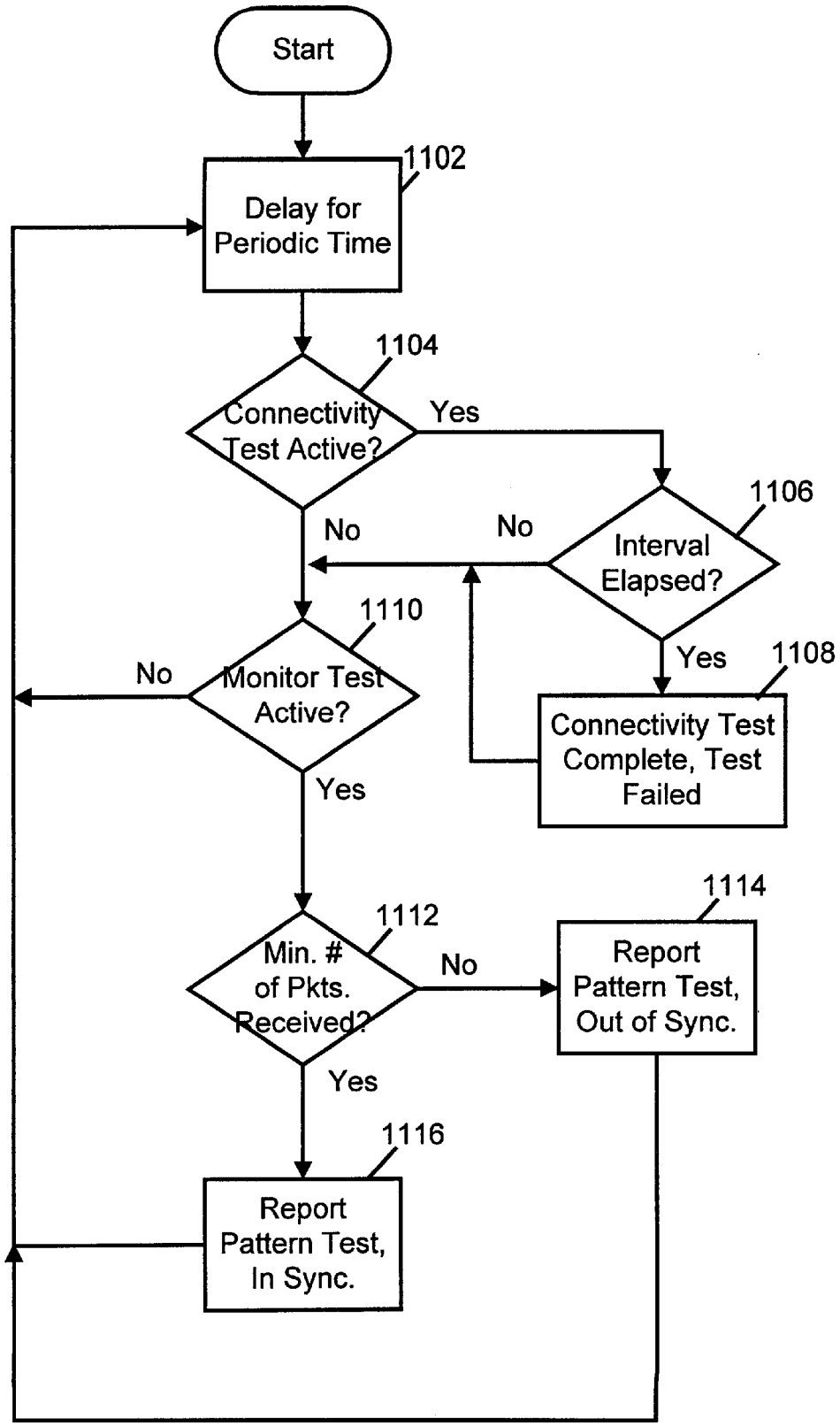
FIG. 11 is a top-level software flowchart illustrating a receiver-side periodic monitor process in accordance with the preferred embodiment of the present invention.
Figure 12:
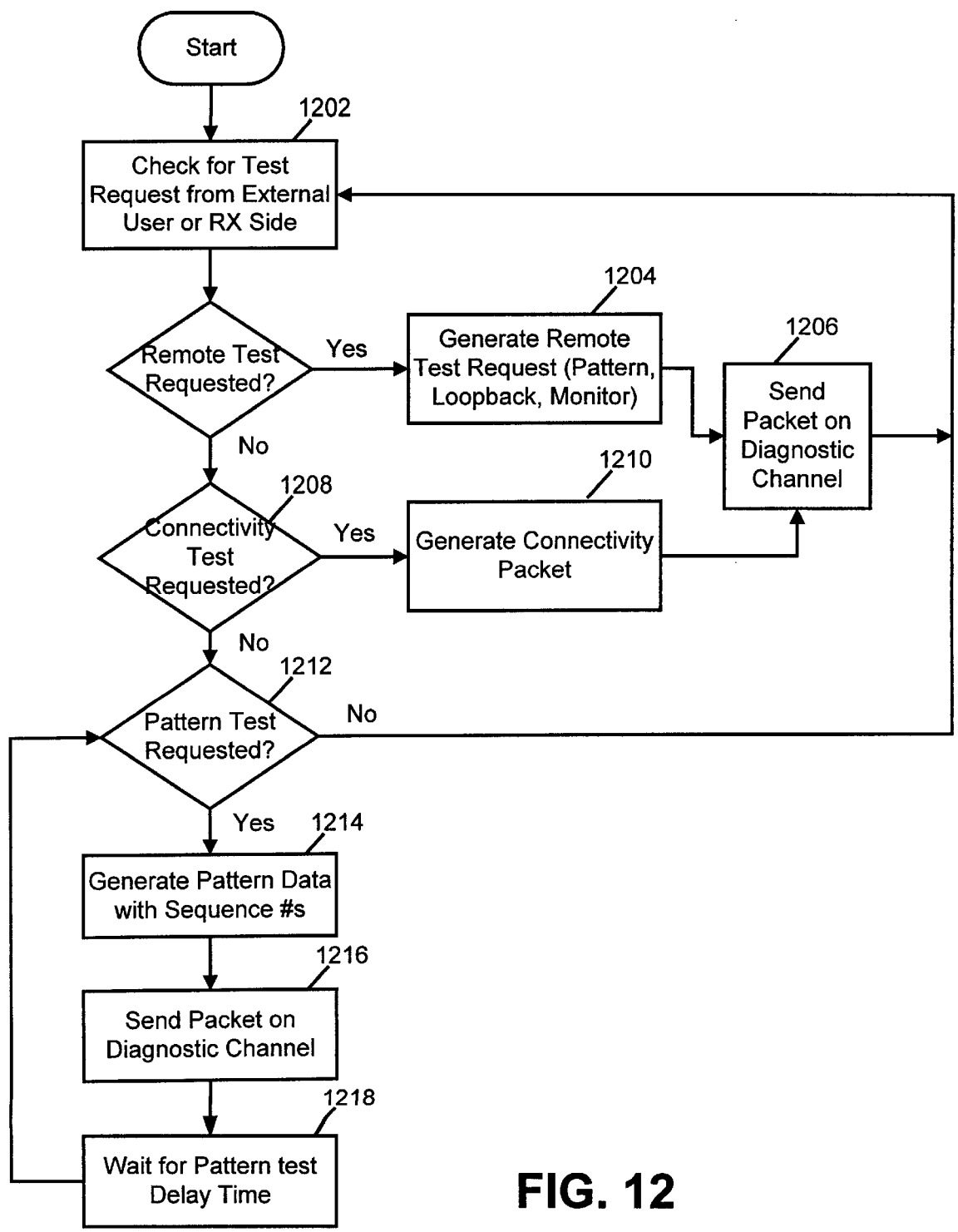
FIG. 12 is a top-level software flowchart illustrating a transmitter-side operation in accordance with the diagnostic process of the illustrated embodiment.

Having illustrated the concepts of the illustrated embodiment by way of examples, reference is now made to FIGS. 10, 11, and 12 which are software flowcharts depicting the top-level operation of the preferred embodiment of the illustrated embodiment. As an initial note, the use of the term transmission device or receiving device herein reflects only a particular mode of operation. It will be appreciated that the same physical device implements both the transmission and receiving functions. Reference is made to devices as transmitting devices and receiving devices merely for purposes of illustration, to discuss particular operational features of the physical devices.

Having said this, reference is made to FIG. 10 which illustrates the top-level operation of a receiving device, constructed in accordance with the preferred embodiment of the illustrated embodiment. At step 1002, the device awaits the receipt of a packet of information on the diagnostic channel. Of course, this packet of information could be a packet in a test sequence, it could be a test instruction or command, or any other message packet in accordance with the illustrated embodiment. Upon receiving the packet on the diagnostic channel, the receiving device evaluates the packet to determine if it is a start pattern test command (step 1004). If so, the receiver enables the pattern test routine (step 1006). Otherwise, the system proceeds to step 1008, where it determines if the received packet is a command to start monitor pattern testing. If so, the receiver enables its pattern monitor test (step 1010).

If the test of step 1008 resolves to NO, the receiver determines whether the received packet is a command to start loopback testing (step 1012). If so, it enables its loopback testing (step 1014). Otherwise, it looks to the message type element of the packet to determine whether it is a pattern test (step 1016). If so, it determines whether a monitor pattern test is running (step 1018). If so, it examines the received data packet to determine both whether the packet contains the correct sequence number and if so, whether the pattern data contained within the packet is correct (steps 1020, 1022, and 1024). If either the sequence number is incorrect or the pattern data itself is inaccurate, the system reports an error.

At step 1026, the receiver evaluates whether a loopback test is running. If so, it transmits the packet back to the transmitting device on the diagnostic channel (step 1028). If step 1026 resolves to NO, the receiver evaluates whether a connectivity test is running (step 1030). If a connectivity test is running, the receiver generates the appropriate connectivity response and sends a response back to the transmitting device on the diagnostic channel (steps 1032 and 1034).

Referring to FIG. 11, an alternative embodiment of the receiving device is illustrated. The embodiment illustrated in FIG. 11 is for periodic monitoring of the receiver side diagnostics. In this regard, a predetermined delay (step 1102) is designed into the receiver. Thereafter, the receiver (at step 1 104) determines whether a connectivity test is active. If so, it determines whether a predetermined interval of time has elapsed (step 1106), and if so, it indicates the connectivity test has failed (step 1108). At step 1110, it determines whether the monitor test is active, and if so, whether a minimum number of packets have been received (step 1112). If not, it reports the pattern test is out of synchronization (step 1114) and returns to step 1102. If, however, the monitor test is active, and a minimum number of packets has been received correctly, the receiver reports that the pattern test is in synchronization (step 1116).

Referring to FIG. 12, a flowchart illustrates the top-level operation of a transmitter constructed in accordance with the illustrated embodiment. Illustrated as an initial step, the transmitter tests for commands received from other devices requesting the initiation of diagnostic sequences (step 1202). More specifically, the transmitting device may initiate its own diagnostic sequences, or it may initiate diagnostic sequences pursuant to instructions from a remote device. If a remote test is requested, then the system, at step 1204, will generate the remote test in accordance with the instruction received, and will transmit an appropriate packet or packets of data along the diagnostic channel (step 1206). Otherwise, the transmitter will look to determine whether a connectivity test is requested (step 1208). If so, it will generate a connectivity test packet (step 1210) and send that packet on the diagnostic channel to the remote receiving device.

If step 1208 resolves to NO, the transmitter will look to determine whether a pattern test is requested (step 1212). If not, it returns to step 1202. If so, however, it generates pattern data, divides that data into data packets, and assigns each packet a particular sequence number (step 1214). It then sends these packets one by one to a remote receiving device, on the diagnostic channel (step 1216). At step 1218, the transmitter waits for a predetermined period of time before continuing to send packets.

Again, the flow charts of FIGS. 10, 11, and 12 are provided to merely illustrate the preferred embodiment of the illustrated embodiment. The particular tests and manner of carrying out the diagnostic routines can be implemented in a wide variety of ways, consistent with the concepts and teaching of the illustrated embodiment, which is merely to provide non-disruptive diagnostics over a virtual circuit by reserving or dedicating (by address) a unique channel for diagnostic communications. All diagnostic communications between a transmitting device and a receiving device are carried out over this uniquely defined channel.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing a fault-tolerant frame-relay communications network, comprising the steps of:

establishing a permanent virtual circuit (PVC) between a first user frame relay equipment and a second user frame relay equipment through a service provided frame relay network;

establishing a plurality of logical communication channels for communicating through the PVC, between the first user frame relay equipment and the second user frame relay equipment, wherein at least one channel of the plurality of channels is reserved as a diagnostic channel used exclusively for performing diagnostics;

using the diagnostic channel to diagnose a failure in the PVC; and dynamically establishing a secondary communications link between the first user frame relay equipment and the second user frame relay equipment, and directing further communications between the first and second user frame relay equipment over the secondary communication link.

2. The method as defined in claim 1, further including the steps of:

continuing to utilize the diagnostic channel to determine when the failure in the PVC has been corrected; and redirecting further communications between the first user frame relay equipment and the second user frame relay equipment across the PVC.

3. A system for providing a user-configurable frame relay network comprising:

a service provided frame relay network;

a plurality of frame relay user equipment;

a plurality of access units, each access unit interposed between the frame relay network and frame relay user equipment, wherein a primary communication link is defined between a first access unit and a second access unit within the frame relay network by a permanent virtual circuit (PVC);

a logical channel creation circuit associated with each access unit, the logical channel creation circuit further including circuitry configured to establish a plurality of communication channels between the first access unit and the second access unit across the PVC;

diagnostic circuitry configured to utilize one of the plurality of communication channels to perform diagnostic tests to detect a failure in the PVC;

at least one secondary communication link extending from the first access unit of the plurality of access units to the second access unit of the plurality of access units, the at least one secondary communication link being outside the service provided frame relay network; and circuitry configured to redirect communications from the PVC to the secondary communication link in response to a detected failure in the PVC.

\* \* \* \* \*

UNITED STATES PATENT AND TRADEMARK OFFICE
CERTIFICATE OF CORRECTION

PATENT NO. : 6,038,219
DATED : March 14, 2000
INVENTOR(S) : Ted N. MAWHINNEY and Richard A. MUNDWILER It is certified that error appears in the above-identified patent and that said Letters Patent is hereby corrected as shown below:

Col. 1, line 36, after "throughput" insert --.--.

Col. 7, line 10, after "just" change "describe" to --described--.

Col. 7, line 25, after "184" insert --are provided--.

Col. 7, line 66, change "pots" to --POTS--.

Col. 9, line 63, after "channel flag" delete "," and insert --.--.

Col. 9, line 64, change "the" to --The--.

Col. 9, line 64, after "are" insert --then--.

Col. 9, line 66, change "ones" to --one--.

Col. 11, line 27, change "ones" to --one--.

Col. 18, line 34, change "1 104" to --1104--.

Signed and Sealed this

Eighth Day of May, 2001

Attest:

NICHOLAS P. GODICI

Attesting Officer

Acting Director of the United States Patent and Trademark Office